March 26, 1968

C. BRENOT 3,374,676

THERMAL GAS FLOW COMPARATOR

Filed Jan. 26, 1965

March 26, 1968   C. BRENOT   3,374,676
THERMAL GAS FLOW COMPARATOR
Filed Jan. 26, 1965   2 Sheets-Sheet 2

สาม,374,676
Patented Mar. 26, 1968

3,374,676
THERMAL GAS FLOW COMPARATOR
Claude Brenot, Paris, France, assignor to CSF—Compagnie Generale de Telegraphie Sans Fil, a corporation of France
Filed Jan. 26, 1965, Ser. No. 428,045
Claims priority, application France, Jan. 27, 1964, 961,591, Patent 1,391,867
6 Claims. (Cl. 73—399)

ABSTRACT OF THE DISCLOSURE

The invention provides an arrangement for comparing gas pressures at two different points of the outer surface of a body in a gas flow. Two ducts have their outer ends arranged for receiving the gas flow; their inner ends open in a chamber, in which two heating elements are positioned for being cooled by said ducts; means derive a signal which is a predetermined function of the differential cooling of said elements.

---

The present invention refers to arrangements for comparing pressures measured at various points of a body set up in a gas flow, for example about an aircraft, in particular of the vertical take off type.

By setting the orientation of the system so that the compared pressures are equal, the inclination of an air flow can be measured with respect to a reference direction related, for example, to an aircraft and perpendicular to the relative direction of the air flow.

Known instruments of this type possesses a detection sensitivity which varies with the relative velocity and is entirely inadequate at low velocities.

This drawback becomes prohibitive when it is required to control the attitude, or the sideslip, of an aircraft in a state of aerodynamic hyper-sustentation or kept vertical by the thrust of its engines, in particular during take-off or landing.

According to the invention there is provided an arrangement of the above type for comparing gas pressures at two different points of the outer surface of a body in a gas flow, wherein at least two ducts whose outer ends are arranged for receiving said gas flow and whose inner ends open in a chamber in which two heating elements are positioned for being cooled by said ducts, and means for deriving a signal which is a predetermined function which is of the differential cooling of said elements.

For a better understanding of the invention and to show how the same may be carried into effect, reference will be made to the appended drawing accompanying the following description and wherein.

Figure 1:
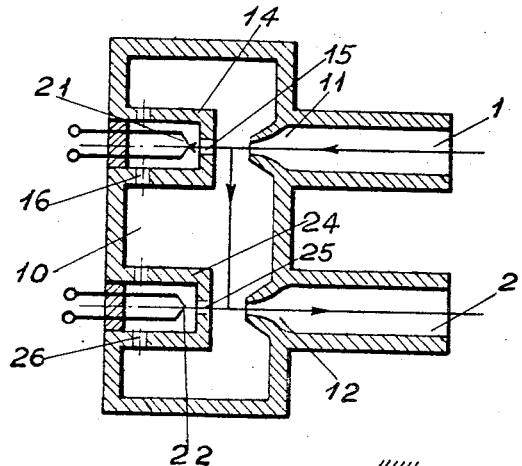
FIG. 1 is a cross-section of one arrangement according to the invention.

In FIG. 1, two ducts 1 and 2 open into a hollow part comprising a chamber 10 through respective terminal nozzles 11 and 12, respectively opposite two pre-heated thermister elements 21 and 22, designated as "hot elements." Each of these elements is protected against turbulence which may occur in chamber 10, by an envelope, 14 and 24, provided with an opening, 15 and 25, situated between the thermo-resistive element and the nozzle opposite to it, and a lateral opening, 16 and 26, by which air returns from the envelope into chamber 10.

The hot elements 21 and 22 preferably consist of two very fine metal wires, for example, of nickel-chrome alloy, whose resistances varies substantially linearly with temperature.

Wires 21 and 22 are heated by an electric current flowing therethrough, and cooled by the jets from nozzles 11–12.

Filters (not shown) are inserted in channels 1 and 2 to protect the filaments from dust.

The operation of the thermal detector system shown in FIG. 1 will now be explained.

When the pressure in duct 1 is higher than in duct 2, air flows in chamber 10 from nozzle 11 to nozzle 12. The result is that, whereas nozzle 12 which draws air from chamber 10 produces no jet capable of cooling filament 22, nozzle 11 discharges into chamber 10 a jet which cools filament 21. The arrows show schematically the circulation of the gas in the chamber.

The hot elements 21 and 22 are thus raised to different temperatures and become unequally resistant. It is then an easy thing by using well known electrical circuits to obtain an error signal which becomes zero when the pressures in ducts 1 and 2 are equal, this current increasing as the pressure difference increases.

Figure 2:
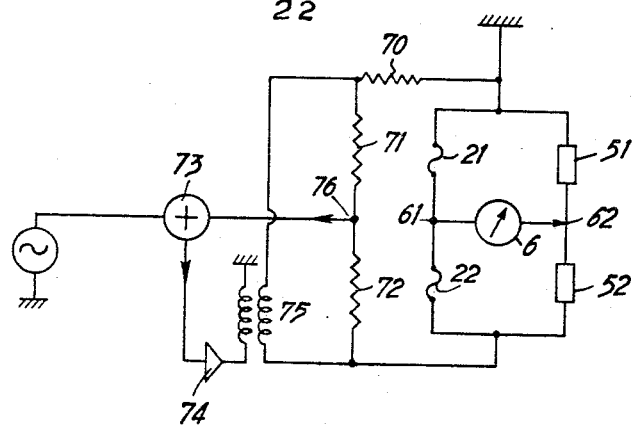
FIG. 2 shows the electrical circuit which supplies an electrical error signal according to the invention.

FIG. 2 shows schematically a Wheatstone bridge circuit for measuring the difference between the two pressures collected at 1 and 2, in the form of a voltage. The two thermo-resistive elements 21 and 22 connected in opposition in a Wheatstone bridge are fed by a source 4 at terminals 41 and 42 and including balancing impedances 51 and 52 of equal value. The unbalance voltage is detected between terminals 61 and 62. The common terminal of resistors 21 and 51 is grounded.

This bridge is energized by means of a further bridge having four arms. A first arm is the first bridge; a second arm is a resistor 70 which has a grounded terminal, and at rest, balances the first bridge. Third and fourth arms comprise respectively two resistors of equal value 71 and 72.

The common terminal 76 of resistors 71 and 72 is connected to an input of an additive cell, having a further input connected to an A.C. source 4 having a grounded terminal.

The output voltage of the cell 73 is fed to the further bridge by means of an amplifier 74, a transformer 75 having a primary having a grounded terminal and a secondary connected between the common terminal of resistors 70 and 71, and to the free terminal of the first mentioned bridge.

The system operates as follows: when the sum of the resistance values of 21 and 22 varies under the action of the gas flow, the second bridge is unbalanced; a voltage appears at terminal 76; this voltage is in phase or phase opposition with the voltage of 4 if the resistor 21, or resistor 22 are cooled respectively. This voltage is algebraically added with the voltage of source 4 in the cell 73. The resulting voltage energizes the first bridge.

This device improves the sensitivity of the system. In face, if the current increases, the heating of the wire which is not cooled is enlarged; this current has a negligible action over the wire which is cooled.

This has for consequence an increasing of the unbalance of the first bridge.

The voltage appearing between 61 and 62 can be used, either directly in a meter 6, or, after appropriate amplification, in a servo-system comprising for example a motor for controlling the attitude of the aircraft, or of the device, with respect to the aircraft.

The sign of this voltage corresponds to the direction of fluid flow. It is zero when the two collected pressures are equal. It is limited to the value reached when the filament which receives the air jet cannot be cooled further.

Figure 3:
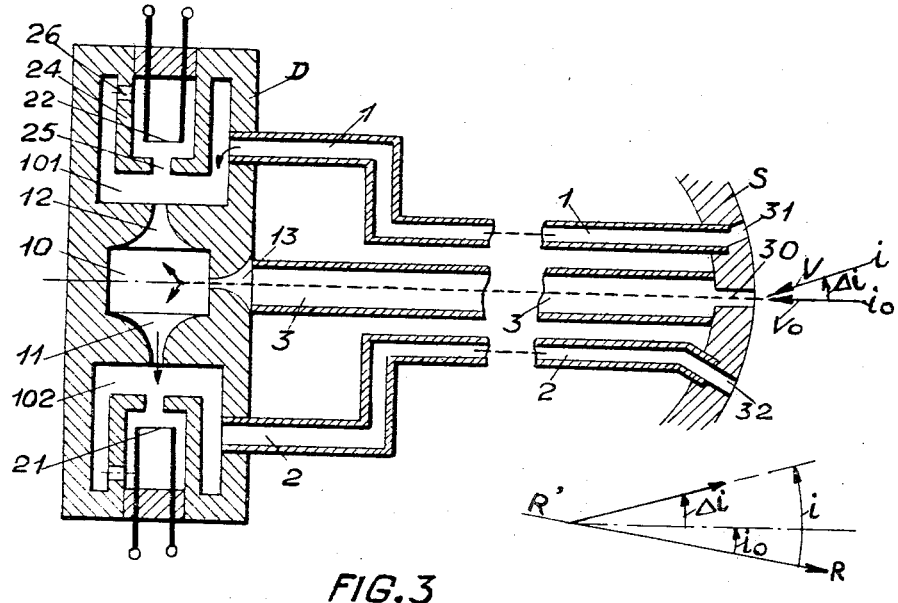
FIG. 3 is a cross-section of a modification.

FIG. 3 shows the cross-section of a modified arrangement according to the invention.

It comprises two ducts 1 and 2 connected to respective openings 31 and 32 in an outer wall 5 at equal distances and on either side of a plane of symmetry of the system in which lies the axis of the central opening 30 of a central duct 3.

Channel 3 opens into chamber 10, in the middle thereof, through a nozzle 13 of high pneumatic impedance The channel 1 opens in a cavity 101 formed in the hollow part D, and which is connected to a chamber 10 through a duct 12. The latter directs a jet of air onto a filament 22 suitably protected from possible disturbance by an envelope 24, provided with an air entry opening 25 opposite nozzle 12 and a lateral opening 26 for air evacuation.

Symmetrically, channel 2 opens into a cavity 102 connected to chamber 10 by a nozzle 11 of the same pneumatic impedance as nozzle 12.

Filaments 21 and 22 are heated by a current from a source 4, whose value increases with the velocity of the air flow, as described with reference to FIGURE 2. This variable current supply prevents the effects of large variations of the surrounding temperature and, as will be seen further on, prevents effects due to turbulence within the pneumatic circuit.

The arrangement of FIG. 3 operates as follows:

Let first be considered the case in which the plane of symmetry of the arrangement contains the vector $\vec{V_o}$ of the air flow relative velocity.

Under these conditions, the pressure collected at opening 30 is equal to the sum of the air flow static and dynamic pressures. The pressures collected at openings 31 and 32 are both equal to the sum of the static pressure and of an equal fraction of the dynamic pressure, which is all the smaller as the opening entries are more inclined with respect to Vo and which is zero for a certain inclination which depends on the velocity. In particular, if the axes of openings 31 and 32 are at an angle of about 33.5° with the direction Vo, the pressures collected at 31 and 32 are substantially equal to the static pressure, at least so long as the velocity does not exceed about 200 metres per second.

In any case, when the plane of symmetry of the arrangement lies in the direction of the air flow, the two nozzles 11 and 12 pass equal flows and the error signal, as supplied, for example by a Wheatstone bridge, as in FIG. 2 is zero.

Considering now the general case i.e. that in which the relative velocity vector $\vec{V}$ is inclined at a small angle $\Delta i$ to the plane of symmetry of the arrangement, the pressure collected at opening 31 increases by $\Delta p$ with respect to the pressure collected at opening 32.

An air flow, whose flows is proportional to the pressure difference $\Delta p$ is established between ducts 1 and 2, this flow is added to the jet from nozzle 11 towards element 21 and is subtracted from the jet from nozzle 12 towards element 22, duct 3 providing thus what may be called a "pneumatic biasing," the word "biasing" being used somewhat in the same sense as in electron discharge tube technics.

When comparing this action with that of the arrangement shown in FIG. 1, it is seen that the temperature of the hot elements for $\Delta i=0$ is brought, on the characteristic R(T) of the thermal detector, from the end point $T_M$ corresponding to the maximum temperature of a cooled element (FIG. 4) to a working point intermediate between $T_M$ and $T_m$ (FIG. 5), where $T_m$ is the minimum temperature of a hot element within the practical limits of its cooling.

Figure 4:
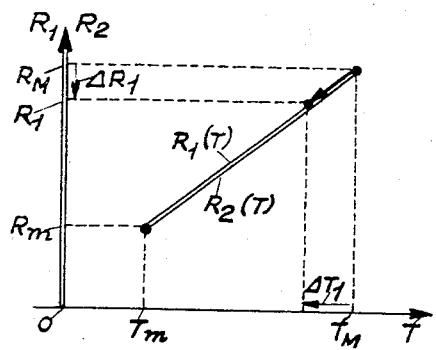
FIGS. 4 to 7 are charts relating to the operation of the arrangement according to the invention.
Figure 5:
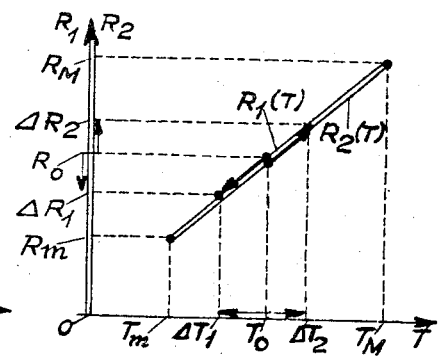

FIGS. 4 and 5 show the variation, as a function of the temperature T, of resistances $R_1$ and $R_2$ of the two hot elements, respectively without and with "pneumatic biasing."

In both cases, the detector sensitivity is proportional to $$\frac{\Delta(R_1-R_2)}{\Delta i}$$

In the cases of FIG. 4, $\Delta(R_1-R_2)=\Delta R_1$, whereas in FIG. 5 $\Delta(R_1-R_2)=\Delta R_1-\Delta R_2 \approx 2\Delta R_1$, since:

$$\Delta T_2 \approx -\Delta T_1, \text{ whence } \Delta R_2 \approx -\Delta R_1$$

whence $\Delta R_2 \approx \Delta R_1$.

It is to be noted that more than one pair of ducts 1 and 2 may be used for cooling one or more pairs of hot elements.

Figure 6:
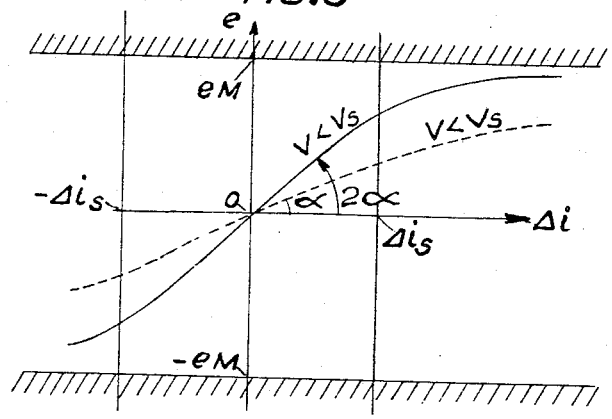
Figure 7:
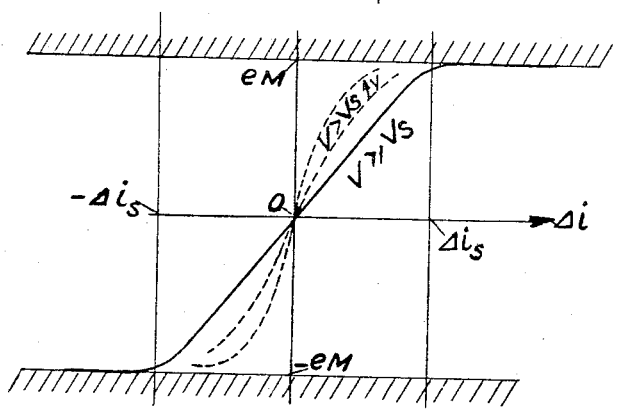

FIGS. 6 and 7 show the variation of the error signal $e$ as a function of the angle $i$, in full lines for an arrangement with pneumatic bias, i.e. as shown in FIG. 3. FIG. 6 corresponds to low velocities and FIG. 7 to high velocities.

As shown in FIG. 6, detection sensitivity measured by the slope tan $\alpha$ of the curve $e$ is substantially doubled with pneumatic biasing.

In FIG. 7, the sensitivity with pneumatic biasing does not increase for velocities beyond a certain velocity $V_s$, which depends on the structure of the arrangement while the sensitivity without biasing continues to rise, so that it overshoots the sensitivity with biasing at the higher velocities.

The above sensitivity limitation is due to the fact that, when the cooler one of the hot elements is at its minimum temperature $T_m$, the other elements is substantially at its maximum temperature $T_M$, for it receives no gas jet at all, when $\Delta i=\Delta i_s$, so that the difference $R_1-R_2$, hence the error signal $e$, does not increase any more, while $\Delta i$ increases beyond $\Delta i_s$ and when the velocity increases beyond the above defined value $V_s$.

The value of the pneumatic impedance $z_3$ of nozzle 13 is determined in relation to the pneumatic impedance $z_1=z_2=z$ of nozzles 11 and 12 so that the initial sensitivity shall have the desired value, for example for setting the gain of an associated servo-loop. In practice, the impedance $z_3$ will be very low as compared to Z.

For example, to make $\Delta i_s=0.15°$, $z_3$ will have to be equal to 132.5 z.

In the case of the arrangement of FIG. 3, it is specially advantageous to heat the filaments by a variable heating current as mentioned above, in order to compensate for the loss of sensitivity by internal turbulence at high velocities.

Internal pressure fluctuations resulting from turbulence have the effect of more energetically cooling the filament which is to be cooled, but also of cooling the filament which does not have to be cooled. On the whole, it would be found, for a constant heater current, that the error voltage would drop. The servo-motor would no longer receive sufficient current, for example, to enable it to bring the ducts to inclination $i_0$ with respect to the reference direction R'R related to the aircraft. But, by the use of variable heater current which maintains constant the sum of the resistances of the hot elements, hence the sum of their temperatures, the overall lowering of the temperatures due to turbulence of the bridge at the value it would have had without turbulence.

The arrangement according to the invention may be used for velocity measurement purposes, if openings 31 and 32 collect substantially the static pressure at the velocities under consideration. It is then an easy thing to show, as well known in the art, the difference between the pressures in channel 3 and that in one of the channels 1 or 2. This difference is very close to the dynamic pressure and is proportional to the square of the velocity.

The arrangement according to the invention can also be used to show on a meter, on the instrument board the instantaneous variations of $\Delta i$ with respect to an angle of attack $i_0$ which it is required to maintain: in this way the pilot is provided with visual information which enables him to work his controls for stabilising the aircrafts about the desired attitude or side-slip angle.

Of course, the invention is not limited to the embodiments described and shown which were given solely by way of example.

What is claimed is:

1. An arrangement for comparing gas pressures at first and second points of the outer surface of a body in a gas flow, said arrangement comprising: at least one pair of ducts, including a first duct, having a first open end opening at said first point for receiving a first part of said gas flow and a second open end, and a second duct, having a third open end opening at said second point for receiving a second part of said gas flow and a fourth open end; a hollow part, said second and fourth ends opening into said hollow part; heating elements positioned in said hollow part for receiving a gas flow, from said second and fourth ends respectively; and means for delivering a signal which is a predetermined function of the differential cooling of said elements by said gas.

2. An arrangement for comparing gas pressures at first and second points of the outer surface of a body in a gas flow said arrangement comprising: a first duct having a first open end opening at said first point for receiving a first part of said gas flow and a second open end; a second duct having a third open end opening at said second point for receiving a second part of said gas flow and a fourth open end; a hollow part, said second and fourth ends opening into said hollow part; heating thermistor elements positioned in said hollow part for receiving a gas flow from said second and fourth ends respectively; means for feeding an electrical current to said elements; and means for comparing the currents respectively flowing in said elements.

3. An arrangement for comparing gas pressures at first and second points of the outer surface of a body in a gas flow said arrangement comprising: a first duct having a first open end opening at said first point for receiving a first part of said gas flow end and a second open end; a second duct having a third open end opening at said second point for receiving a second part of said gas flow and a fourth open end; a hollow part, said second and fourth end opening into said hollow part; heating thermistors positioned in said hollow part for receiving a gas flow from said second and fourth ends respectively; and a Wheatstone bridge means having two branches in parallel, one of said branch including said two elements connected in series.

4. An arrangement for comparing gas pressures at first and second different points of the outer surface of a body in a gas flow said arrangement comprising: a first duct having a first open end opening at said first point in said gas flow and a second open end; a second duct having a third open end opening at said second point in said gas flow and a fourth open end; a third duct with respect to which said first and second ducts are symmetrical, said third duct having a fifth open end for receiving said gas flow and a sixth open end; a hollow part, said second and fourth and sixth ends opening into said hollow part; two heating thermistors positioned in said hollow part for receiving a two gas flow from said second and fourth ends respectively; and for equally receiving a gas flow from said sixth end; and means for deriving a signal indicative of the differential cooling of said elements by said gas flow.

5. An arrangement for comparing gas pressures at first and second different points of the outer surface of a body in a gas flow said arrangement comprising: a first duct having a first open end opening at said first point in said gas flow and a second open end; a second duct having a third open end opening at said second point in said gas flow and a fourth open end; a third duct with respect to which, said first and second ducts are symmetrical, said third duct having a fifth open end opening in said gas flow and a sixth open end; a hollow part having a first portion and a second portion into which said second and fourth ends open respectively; first and second heating thermistors positioned in said first and second hollow part portions respectively for receiving a gas flow from said second and fourth ends and a third hollow part portion intermediate said first and second hollow part portion and into which said third duct opens for receiving a gas flow from said fifth end said third chamber portion having identical communications with said first and second chamber portions and means for deriving a signal indicative of the differential cooling of said first and second thermistors by said gas flow.

6. An arrangement for comparing gas pressures at two different points of the outer surface of a body in a gas flow said arrangement comprising: a first duct having a first open end for receiving a gas flow and a second open end; a second duct having a third open end for receiving a gas flow and a fourth open end; a third duct with respect to which said first and second ducts are symmetrical, said duct having a fifth open end for receiving said gas flow and a sixth open end; a hollow part having a first portion and a second portion which said second and fourth ends open respectively; first and second heating thermistors positioned in said first and second hollow part portions respectively for receiving said gas flow from said second and fourth ends and a third hollow part portion intermediate said first and second hollow part portion and into which said third duct opens said third hollow part portion having identical communications with said first and second portions; a first bridge having a first arm and a second arm including respectively said heating thermistors, a third and a fourth arm including respectively two resistors of equal value, said bridge being balanced, when said thermistors are equally cooled, and means for collecting an electrical signal indicative of the unbalance of the bridge: a second bridge having a first arm including said first bridge, a second arm including a resistor balancing said first bridge when said thermistors are equally cooled, third and fourth arms, including two resistors of equal values respectively: means for collecting an error signal when said second bridge is unbalanced, and means controlled by said error voltage for energizing said first bridge.

References Cited

UNITED STATES PATENTS

| | | | |
|---|---|---|---|
| 2,214,188 | 9/1940 | Rylsky | 73—240 X |
| 2,512,278 | 6/1950 | Jones | 73—180 |
| 2,736,198 | 2/1956 | Kuhn | 73—180 |
| 3,020,746 | 2/1962 | Minter | 73—27 |
| 3,082,619 | 3/1963 | Nerheim et al. | 73—30 |
| 3,097,520 | 7/1963 | Thompson | 73—27 |
| 3,138,436 | 6/1964 | Harmon | 73—27 X |

LOUIS R. PRINCE, *Primary Examiner.*

DAVID SCHONBERG, *Examiner.*

DONALD O. WOODIEL, *Assistant Examiner.*